(12) United States Patent
Cote

(10) Patent No.: US 10,359,146 B2
(45) Date of Patent: Jul. 23, 2019

(54) POLE ASSEMBLY

(71) Applicant: Paul L. Cote, Lac Brome (CA)

(72) Inventor: Paul L. Cote, Lac Brome (CA)

( * ) Notice: Subject to any disclaimer, the term of this patent is extended or adjusted under 35 U.S.C. 154(b) by 0 days.

(21) Appl. No.: 15/330,904

(22) Filed: Nov. 14, 2016

(65) Prior Publication Data
US 2017/0191284 A1    Jul. 6, 2017

(30) Foreign Application Priority Data

Nov. 13, 2015    (CA) ...................................... 2911981

(51) Int. Cl.
| | | |
|---|---|---|
| *F16M 11/16* | (2006.01) | |
| *A45F 3/44* | (2006.01) | |
| *E04H 12/08* | (2006.01) | |
| *E04H 12/22* | (2006.01) | |
| *A01G 9/12* | (2006.01) | |
| *A01K 39/012* | (2006.01) | |
| *A01K 39/014* | (2006.01) | |
| *F16M 11/04* | (2006.01) | |
| *F16M 11/24* | (2006.01) | |
| *E04H 12/24* | (2006.01) | |
| *E04H 12/34* | (2006.01) | |
| *A01K 39/01* | (2006.01) | |
| *A47G 7/04* | (2006.01) | |
| *F16M 11/22* | (2006.01) | |
| *E02D 5/80* | (2006.01) | |
| *F16M 11/08* | (2006.01) | |
| *A45B 23/00* | (2006.01) | |

(52) U.S. Cl.
CPC ............... *F16M 11/16* (2013.01); *A01G 9/12* (2013.01); *A01K 39/01* (2013.01); *A01K 39/012* (2013.01); *A01K 39/014* (2013.01); *A45F 3/44* (2013.01); *A47G 7/041* (2013.01); *E02D 5/801* (2013.01); *E04H 12/08* (2013.01); *E04H 12/2223* (2013.01); *E04H 12/2238* (2013.01); *E04H 12/24* (2013.01); *E04H 12/347* (2013.01); *F16M 11/041* (2013.01); *F16M 11/046* (2013.01); *F16M 11/22* (2013.01); *F16M 11/24* (2013.01); *A45B 2023/0012* (2013.01); *F16M 11/08* (2013.01); *F16M 2200/028* (2013.01); *F16M 2200/066* (2013.01); *F16M 2200/08* (2013.01)

(58) Field of Classification Search
CPC ............ A45B 2023/0012; E04H 12/24; E04H 12/347
USPC ............. 52/FOR. 152, FOR. 100, FOR. 153, 52/302.5, 296, 157
See application file for complete search history.

(56) References Cited

U.S. PATENT DOCUMENTS

| | | | | |
|---|---|---|---|---|
| 5,752,534 A | * | 5/1998 | Becher .................... | A45B 23/00 135/15.1 |
| 6,830,058 B2 | * | 12/2004 | Li ............................ | A45B 3/04 135/16 |

(Continued)

*Primary Examiner* — Babajide A Demuren
(74) *Attorney, Agent, or Firm* — Eric Fincham

(57) ABSTRACT

A pole assembly which includes a pole, a hub being placed on the pole, the hub having a plurality of enclosed channels formed therein, a plurality of arm assemblies with each arm assembly having a vertical segment designed to fit within a respective channel and an arm extending outwardly from the vertical segment, and a finial designed to sit on top of an upper end of the pole, the finial having a spirit level incorporated therein.

8 Claims, 23 Drawing Sheets

(56) References Cited

U.S. PATENT DOCUMENTS

| | | | | |
|---|---|---|---|---|
| 2002/0175262 A1* | 11/2002 | Brooks, III | ............. | A45B 3/00 248/530 |
| 2002/0176247 A1* | 11/2002 | Lee | ......... | A45B 3/04 362/102 |
| 2008/0083172 A1* | 4/2008 | Tropiano | ............ | E04H 12/2223 52/157 |
| 2009/0126769 A1* | 5/2009 | Hoogendoorn | ........ | A45B 11/00 135/98 |
| 2011/0277800 A1* | 11/2011 | Tung | ..................... | A45B 19/04 135/20.3 |
| 2014/0015268 A1* | 1/2014 | Scolari | ..................... | A01B 1/02 294/50.8 |
| 2015/0173290 A1* | 6/2015 | Scolari | ..................... | A01B 1/02 294/50.9 |
| 2015/0368924 A1* | 12/2015 | Izradel | ................ | E04H 12/2223 362/183 |
| 2016/0021809 A1* | 1/2016 | Scolari | ..................... | A01B 1/02 294/50.9 |
| 2017/0055685 A1* | 3/2017 | Head | ......................... | A45F 3/44 |

* cited by examiner

POLE ASSEMBLY

FIELD OF THE INVENTION

The present invention relates to a pole assembly and more particularly, relates to a pole assembly which can be used outside and which can be used with many different accessories.

BACKGROUND OF THE INVENTION

The use of poles to support another object is well known in the art. If inserted in the ground, typically the poles must be braced or inserted in materials such as concrete in order that they be stable enough to withstand sideways or transverse forces. The insertion of the pole in the soil is at times difficult and does not result in a vertical pole, but rather one which is skewed to one side or the other.

SUMMARY OF THE INVENTION

It is an object of the present invention to provide a pole system which is readily insertable into the soil and which will result in a pole which is vertical.

According to one aspect of the present invention, there is provided a pole assembly comprising a pole, a hub placed on the pole, the hub having a plurality of enclosed channels formed therein, a plurality of arm assemblies, each arm assembly having a vertical segment designed to fit within a respective channel, an arm extending outwardly from the vertical segment, and a finial designed to sit on an upper end of the pole, the finial having a level incorporated therein.

The pole may either be formed as a unitary pole or more preferably, is formed as a plurality of sections. The sections may be suitably connected together—the connection may rely on friction or alternatively, mechanical fasteners can be employed. Such fasteners are well known in the art.

The system utilizes a hub member and preferably, there are a plurality of such hub members. The hub members are designed to engage with the pole and in turn, support other accessories. In a preferred embodiment, the hub member will seat on a pin which extends diametrically through the pole. Thus, there may be provided a plurality of apertures extending diametrically and thus, the hubs may be located at desired locations.

The hub members may be utilized to support a plurality of arm assemblies or in an alternative, may be utilized to support one or more containers. One may also use other arrangements as is known in the art.

When the hubs are supported by a pin, the arrangement is preferably one wherein the hub can rotate if a sufficient force is applied thereto. This may be accomplished by means of a scalloped bottom surface upon which the pin will rest. The scallops are essentially recesses in the wall and can be designed so that when a certain force is applied, the hub will rotate; this can be advantageous if an accidental force is applied to one of the containers or arm assemblies.

The hubs themselves may have one or more channels formed therein for receiving a vertical segment of an arm assembly. The engagement is such that the arms are retained in position by means of friction and no tools are necessary.

The arm assemblies are designed such that an arm extends outwardly and may either have an object hung therefrom or in the alternative, they may support a tray or the like. The objects supported or hung may either be practical, like a bird feeder, or decorative if so desired.

In one embodiment, there are provided upper and lower arm assemblies, the arrangement being such that the upper arm assembly supports a bird feeder while there is a corresponding lower arm assembly which will support a tray to catch excess bird feed. The excess bird feed would then be eaten by birds who normally feed on a flat surface.

The finial used in the present invention is of a double utility. Firstly, it will function as a conventional finial—a decorative finish to the top of a pole or post. However, inside the finial there is a spirit level which may be utilized in aligning the pole when inserting it in the soil. Preferably, the spirit level is of the bull's eye type.

The pole assembly of the present invention is preferably packaged such that it can be readily shipped. To this end, there will a threaded bottom section which can store a pusher rod while the baffle, which is a hollow member, could store all the parts—the pole sections, the arm assemblies, hubs and the finial.

BRIEF DESCRIPTION OF THE DRAWINGS

Having thus generally described the invention, reference will be made to the accompanying drawings illustrating embodiments thereof, in which.

DETAILED DESCRIPTION OF THE INVENTION

Figure 1:
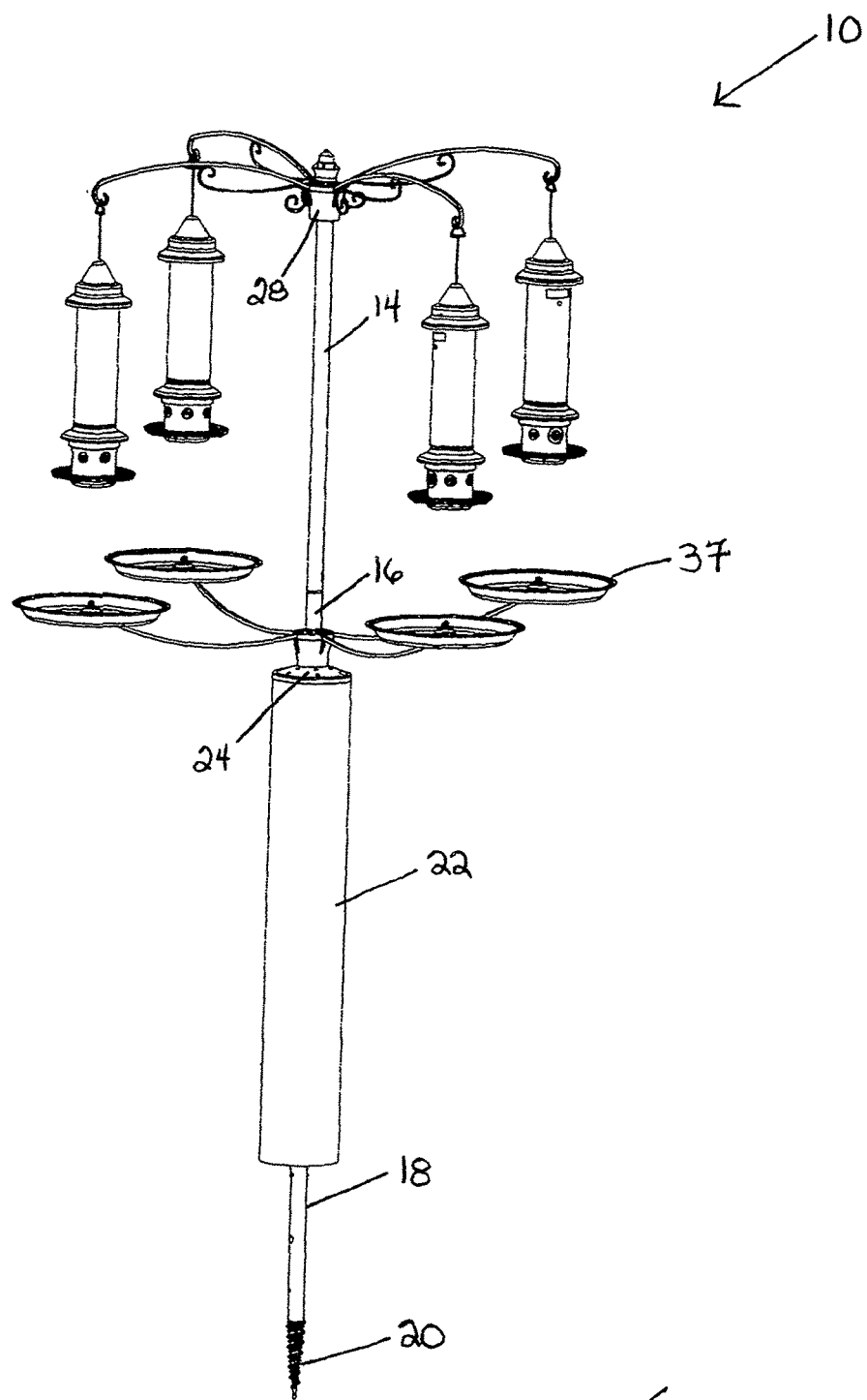
FIG. 1 is a perspective view of an assembled pole system according to one embodiment of the present invention.

Referring to the drawings in greater detail and by reference characters thereto, there is illustrated a pole system which is generally designated by reference numeral 10.

Pole system 10 has a pole which is generally designated by reference numeral 12. Pole 12, in the illustrated embodiment, has an upper section 14, a middle section 16, and a lower section 18. Although three sections are shown, other arrangements such as a unitary pole could be utilized. Sections 14, 16 and 18 may be joined together by suitable means as will be discussed hereinbelow. Naturally, many ways of joining the poles can be utilized including mechanical fasteners, frictional engagement, etc.

Figure 2:
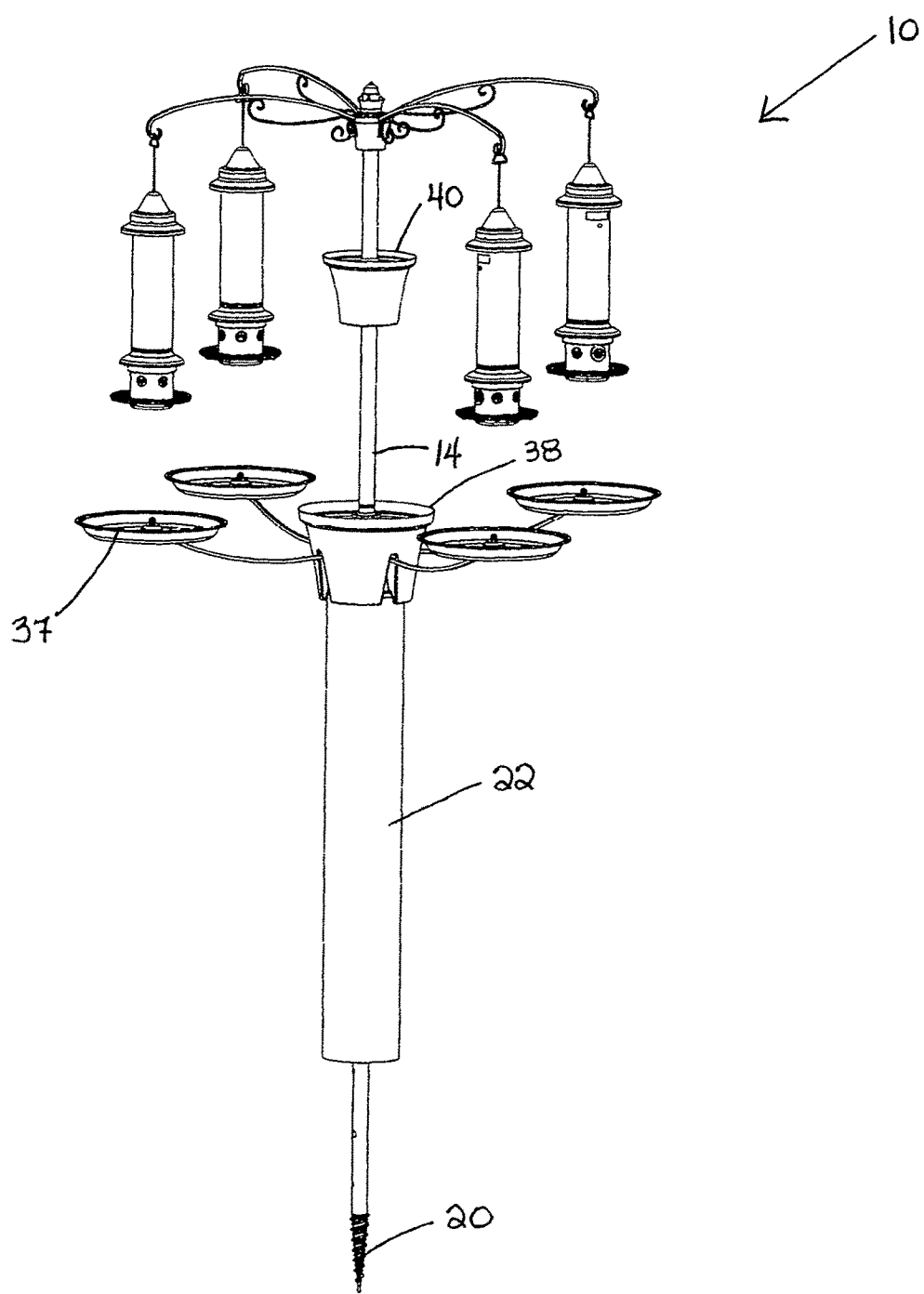
FIG. 2 is a perspective view of a further embodiment thereof.
Figure 3:
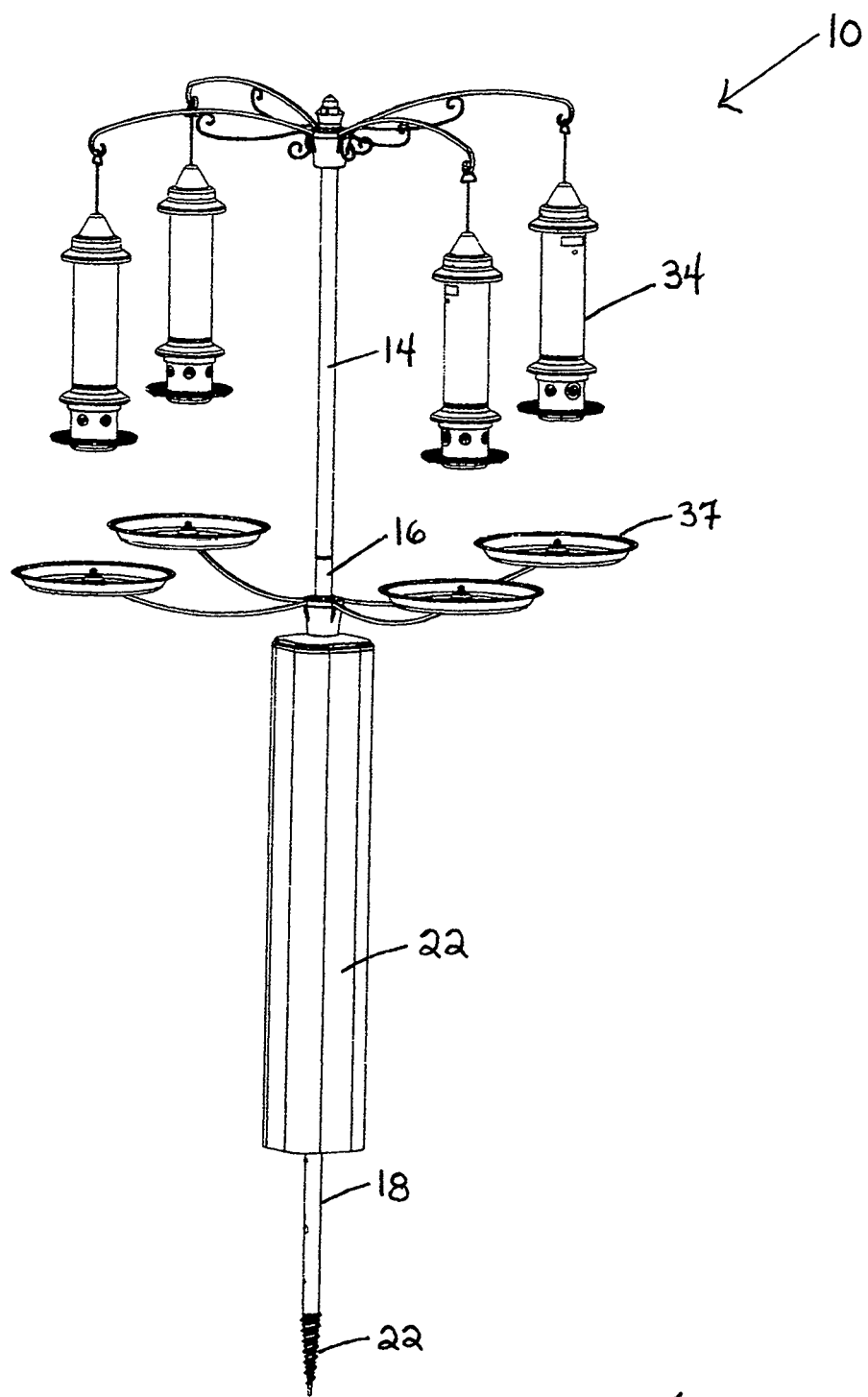
FIG. 3 is a perspective view of a still further embodiment thereof.

In the embodiments of FIGS. 1 to 3, pole 12 includes a screwthreaded lower portion 20. In this regard, the screwthreaded portion 20 is described in greater detail in co-pending application co-pending application Ser. No. 15/330,615 entitled Screwthreaded Pole filed Oct. 19, 2016 in the name of Inventor Paul L. Cote, the teachings of which are hereby incorporated by reference.

A baffle 22 is provided and is mounted on pole 12. Baffle 22 includes a top wall 24 containing apertures 26. Different shaped baffles 22 can be utilized as seen in FIG. 3.

In the embodiment of FIGS. 1 to 3, pole system 10 includes an upper hub 28 and a lower hub 30. Upper hub 28 is utilized to support a plurality of upper arm assemblies 32 from which are suspended bird feeders 34.

Extending from lower hub 30 are a plurality of lower arm assemblies 36 upon which are mounted trays 37. Lower arm assemblies 36 are used to support trays 37. Lower arm assemblies 36 may be supported within a hub or alternatively, may be directly secured to the pole or to the baffle member. In a preferred arrangement, there are provided an equal number of upper arm assemblies and lower arm assemblies with the assemblies being aligned vertically. In the embodiment of FIG. 2, there is provided a lower container 38 and an upper container 40 which can be utilized to grow plants and the like. In particular, one may select plants which are attractive to one or more types of birds.

Figure 4:
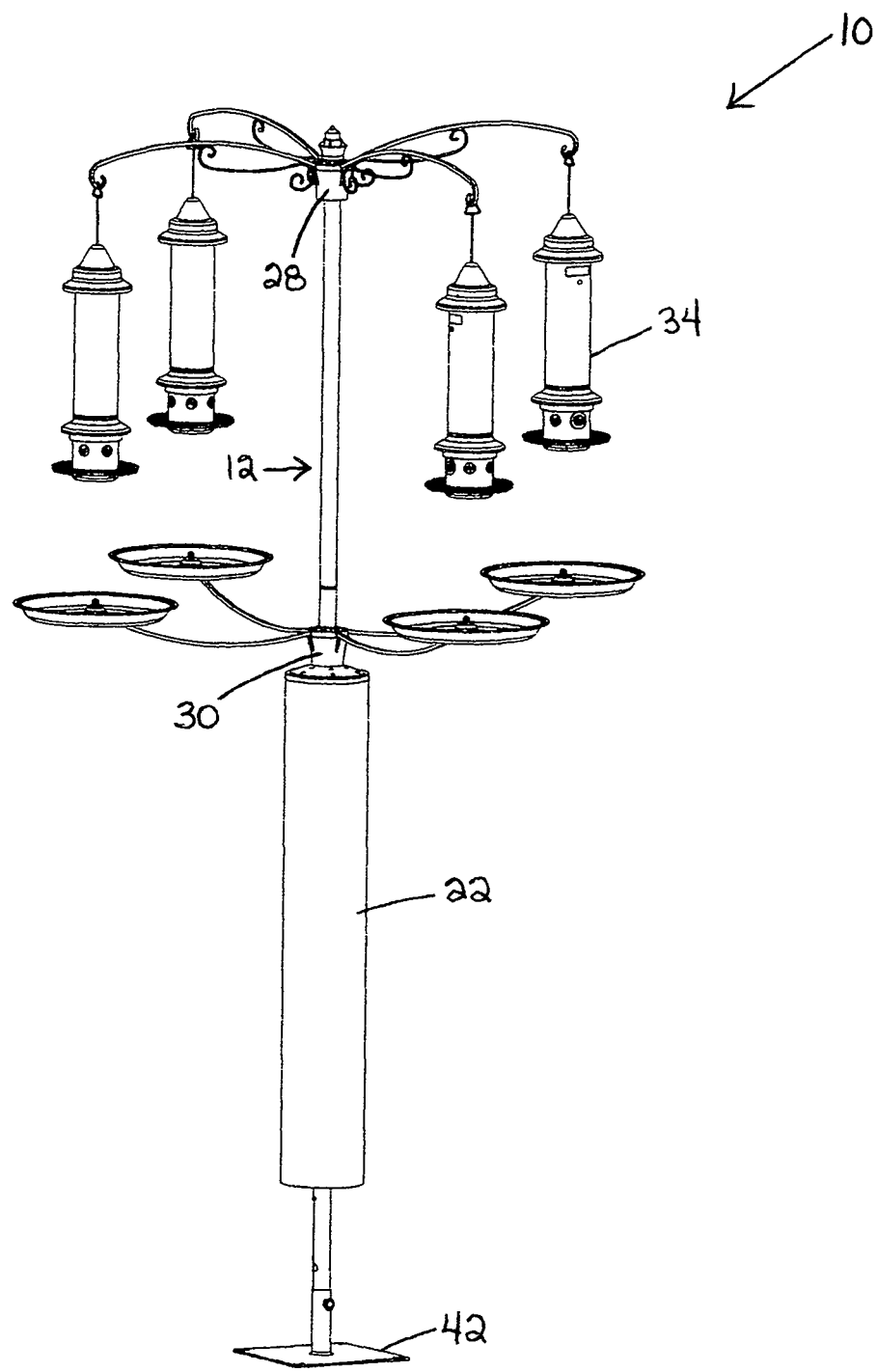
FIG. 4 is a perspective view of a still further embodiment thereof.
Figure 5:
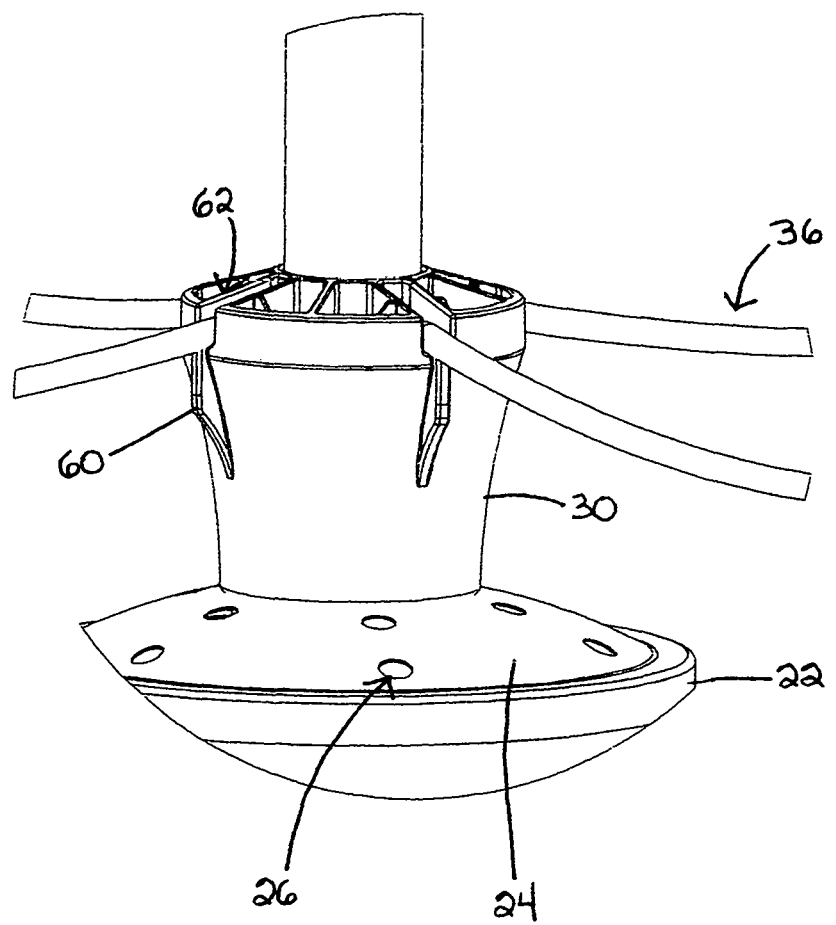
FIG. 5 is a partial view of a hub and container.

As may be seen in FIG. 4, the pole system 10 may also utilize a base 42 onto which pole 12 is mounted.

Figure 6:
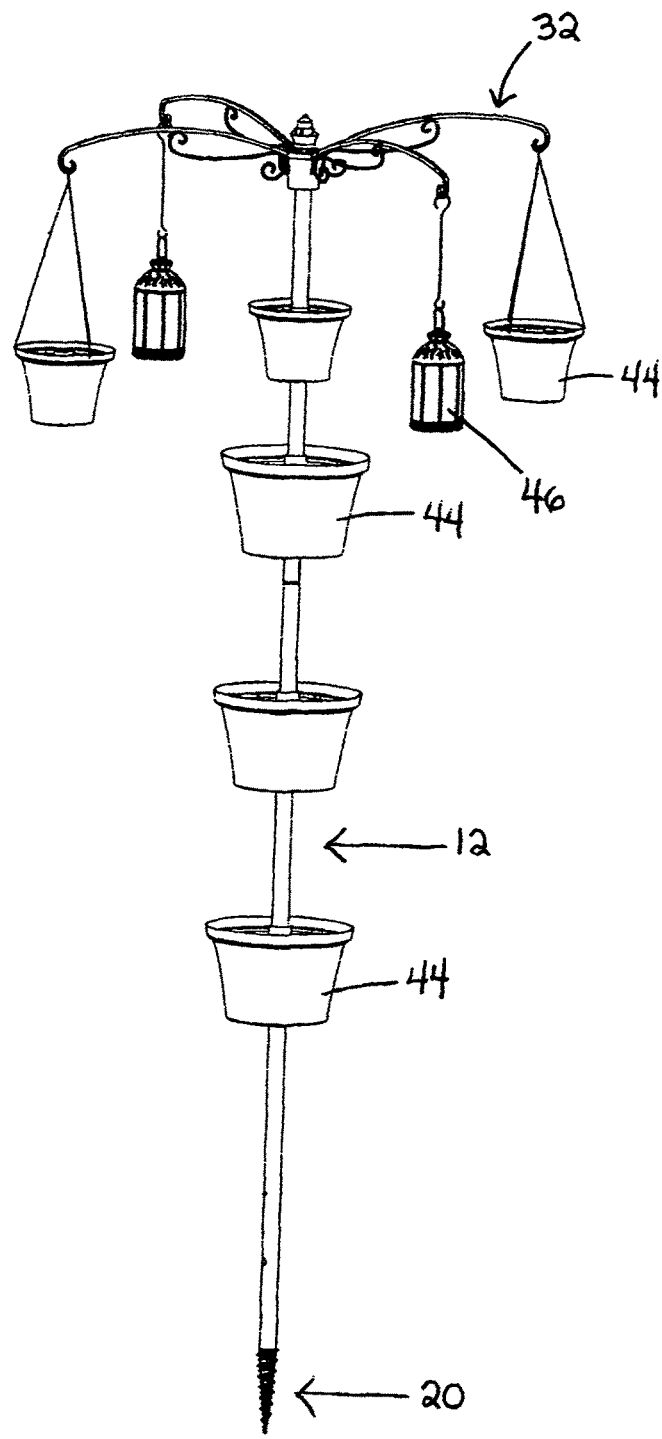
FIG. 6 is a perspective view of a still further embodiment of the present invention.

As may be seen in FIG. 6, pole system 10 may also include a plurality of containers 44. Some of the containers may be mounted on pole 12 while other containers 44 may be hung from upper arm assemblies 32. The pole system could also incorporate decorative hangers for lights, candles or the like as shown by reference numeral 46.

Figure 7:
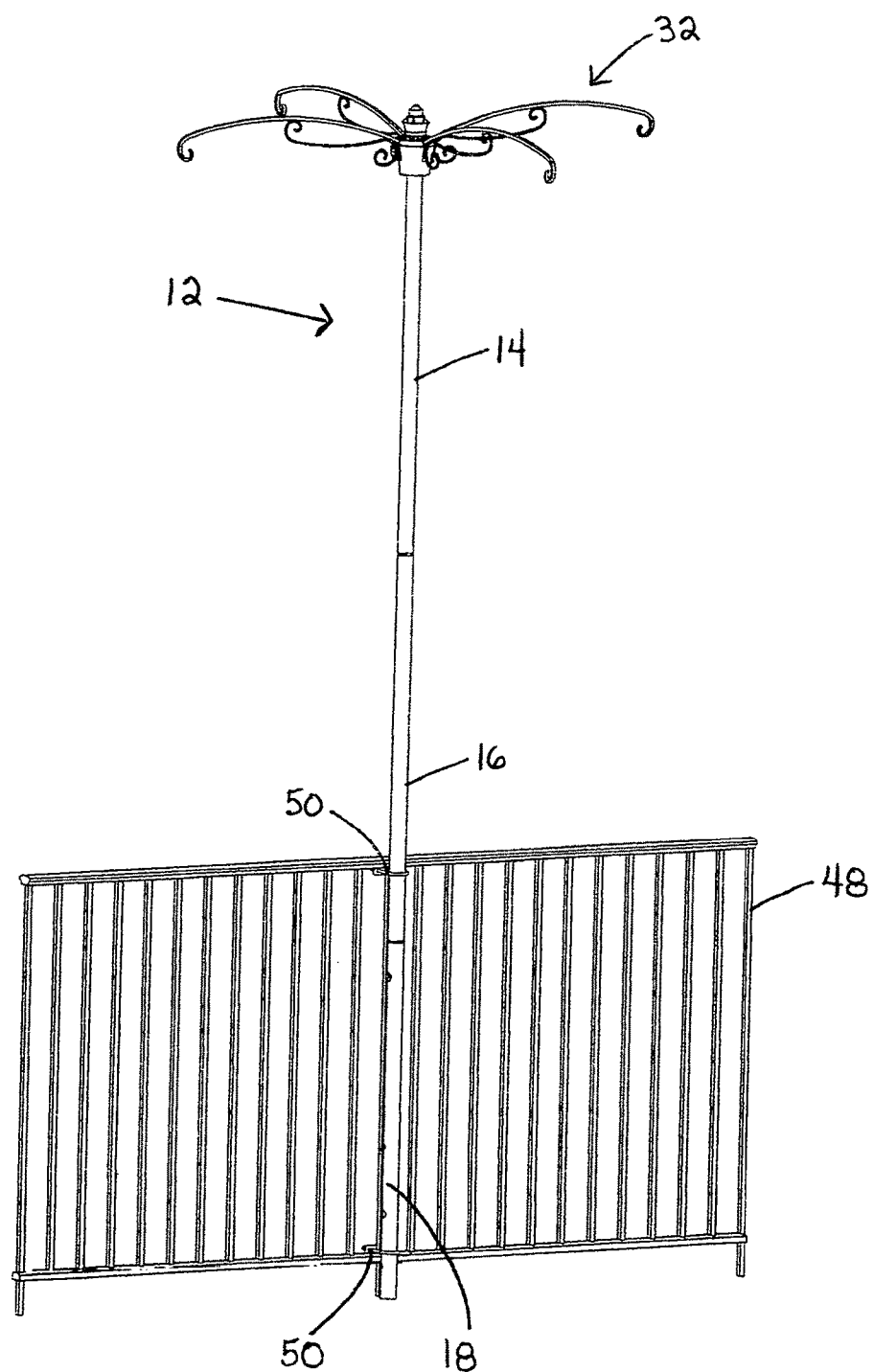
FIG. 7 is a perspective view of a still further embodiment of the present invention.
Figure 8:
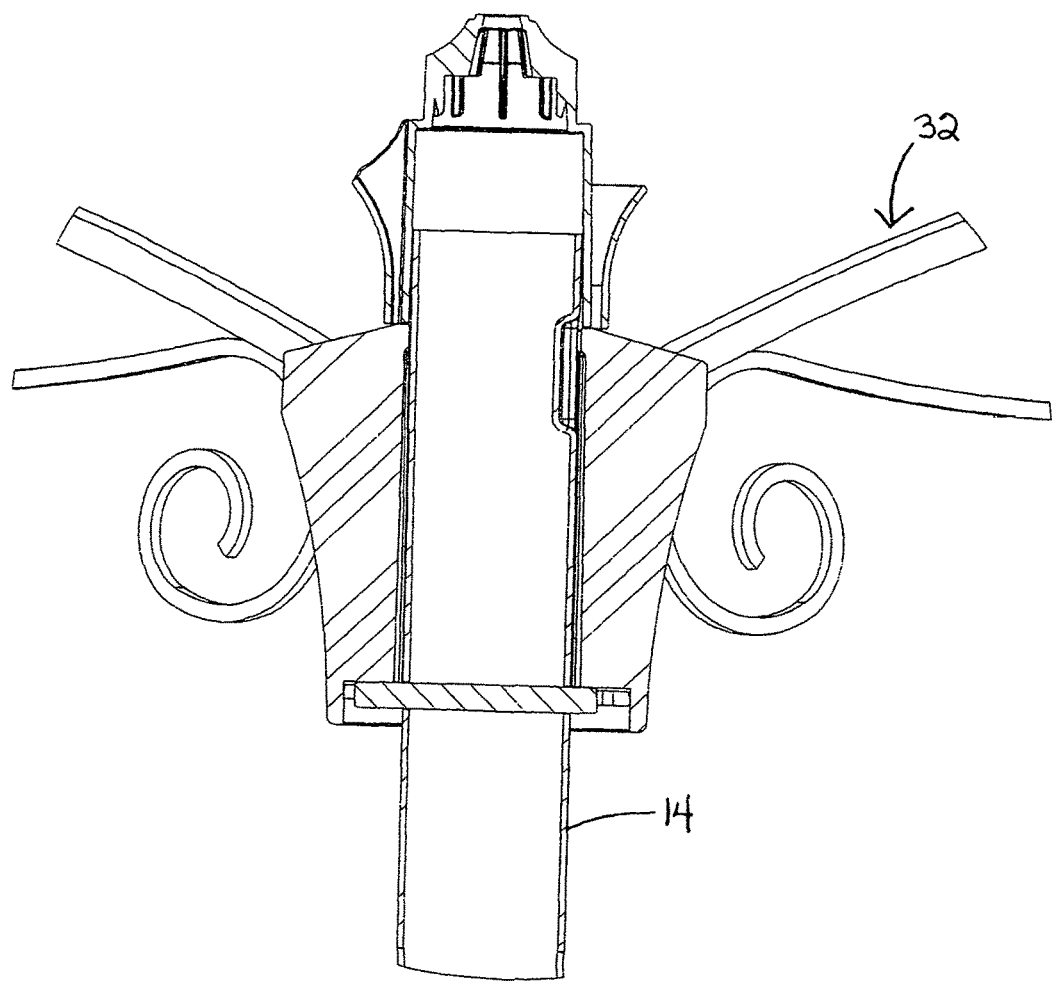
FIG. 8 is a cross-sectional view illustrating an upper hub and finial.
Figure 9:
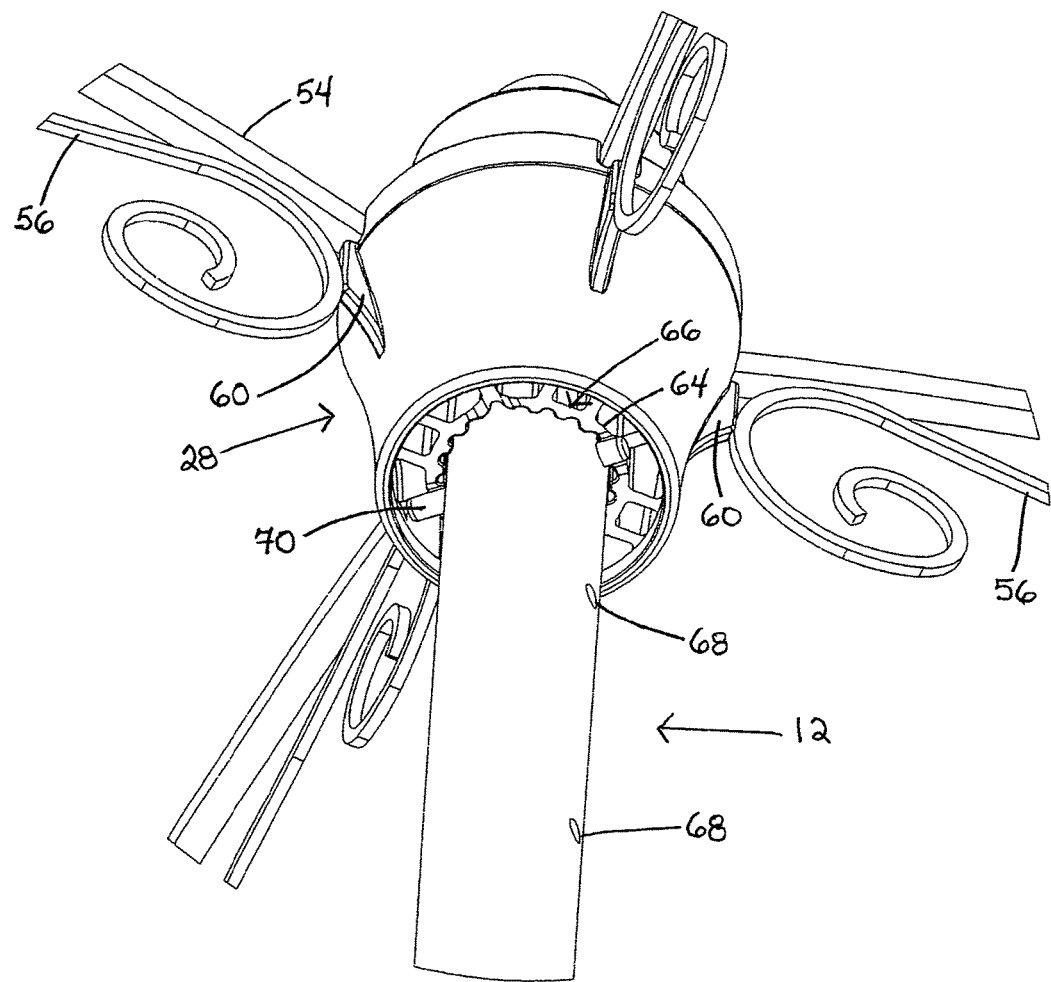
FIG. 9 is a perspective view of the bottom of a hub member mounted on a pole.
Figure 10:
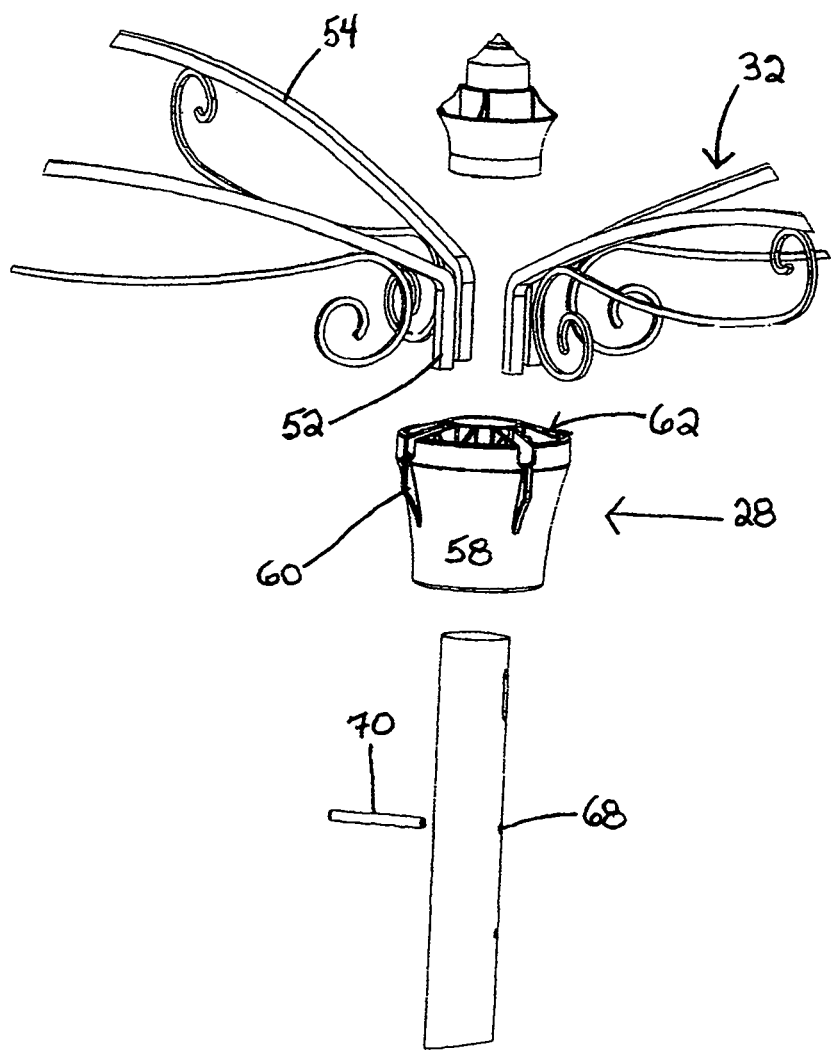
FIG. 10 is an exploded view of the upper portion of a pole system.
Figure 11:
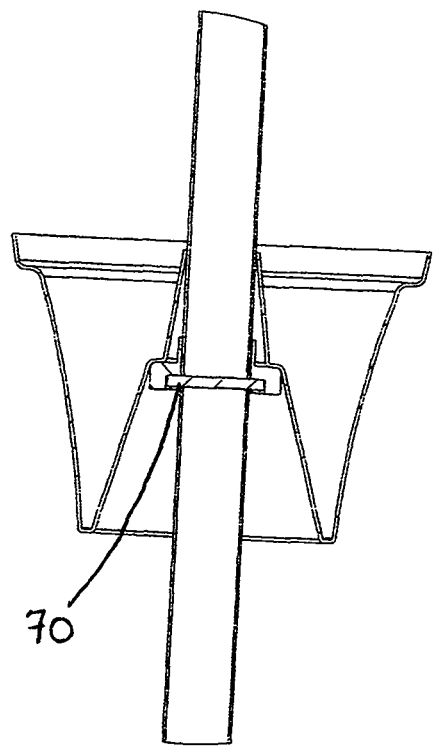
FIG. 11 is a cross-sectional view illustrating the mounting of a container on a pole.

A further arrangement is shown in FIG. 7 wherein pole 12 is secured to a fence by means of clamps 50.

Each upper arm assembly 32 includes a vertical segment 52 with an arm 54 extending therefrom. There is also provided a downwardly extending segment 56.

Upper hub 28 has an outer wall 58 which includes a reinforced area 60. Reinforced area 60 is designed to abut downwardly extending segment 56 to provide support for upper arm assembly 32.

Hub 28 includes a plurality of channels generally designated by reference numeral 62 which are formed between outer wall 58 and inner wall 64. Inner wall 64 includes a bottom surface 66 which is of a scalloped configuration. For the mounting of hub 28, pole 12 is provided with a plurality of diametrically opposed apertures 68 which are designed to receive a pin 70. Hub 28 will then rest on pin 70 and the scalloped bottom surface 66 permits rotation of hub 28 when excessive force is applied thereto. This arrangement is shown in co-pending application entitled Hub Member and Supporting Arms For A Pole Mounted Assembly filed Nov. 11, 2016 in the name of Inventor Paul L. Cote, the teachings of which are incorporated herein by reference.

Figure 12:
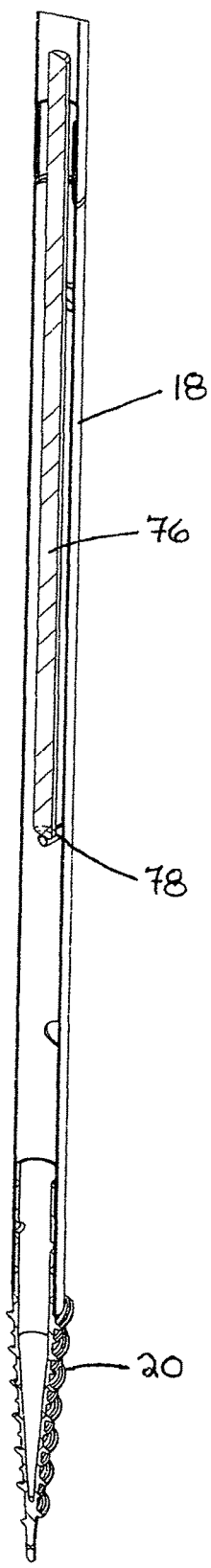
FIG. 12 is a cross-sectional view of the lower section of a pole.
Figure 13:
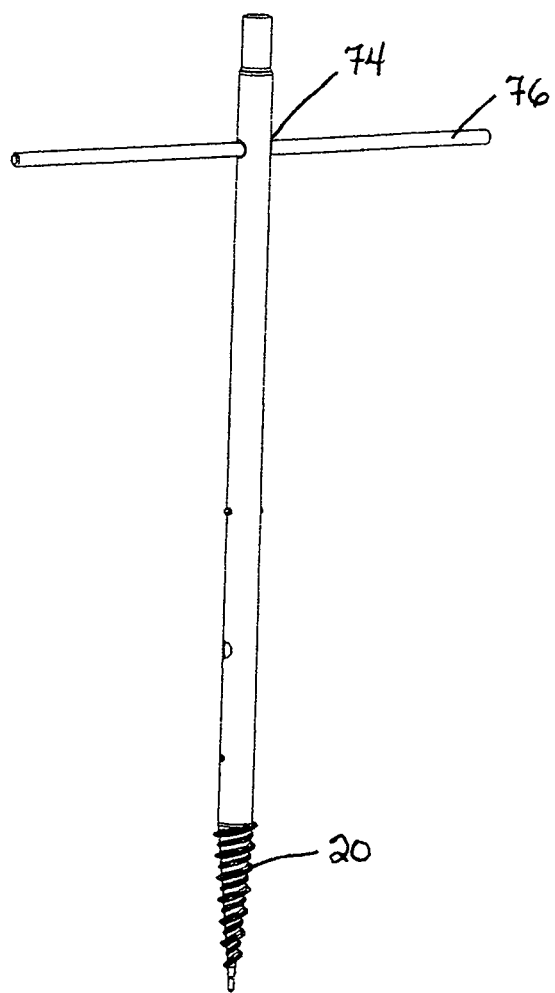
FIG. 13 is a perspective view of a screwthreaded lower section of a pole with a pusher bar for insertion of the pole into soil.
Figure 14:
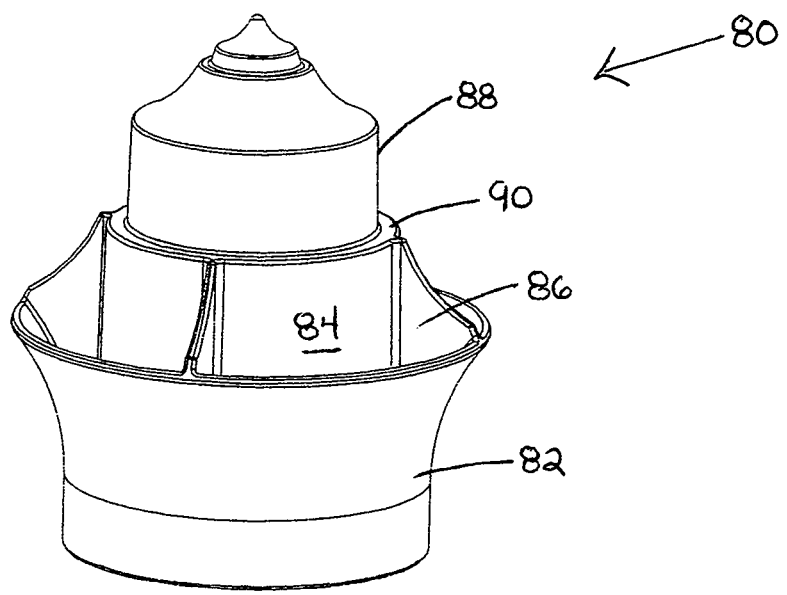
FIG. 14 is a perspective view of a finial.

As shown in FIGS. 12 and 13, lower section 18 is provided with diametrically opposed apertures 74 located near the upper portion of lower section 18. A rod 76 is stored interiorly of lower section 18 and as may be seen in FIG. 12, rests on a protrusion 78. Rod 76 is designed to fit within apertures 74 and thus a transverse force may then be applied thereto to permit the insertion of lower section 18 into the soil.

On top of upper section 14 of pole 12, there is provided a finial generally designated by reference numeral 80. Finial 80 is shown in greater detail in FIGS. 14 to 17 and reference will now be had thereto.

Figure 15:
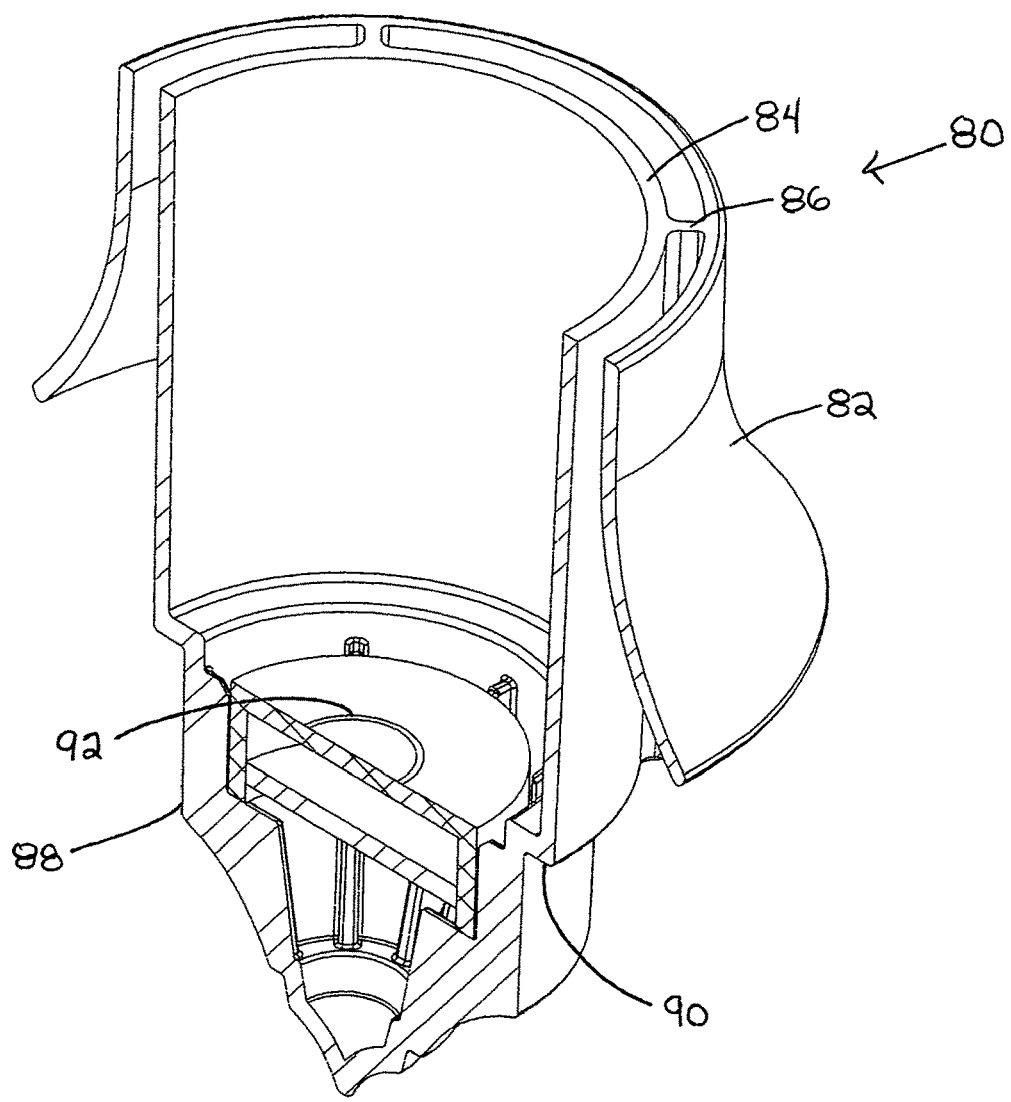
FIG. 15 is a cross-sectional view thereof.
Figure 16:
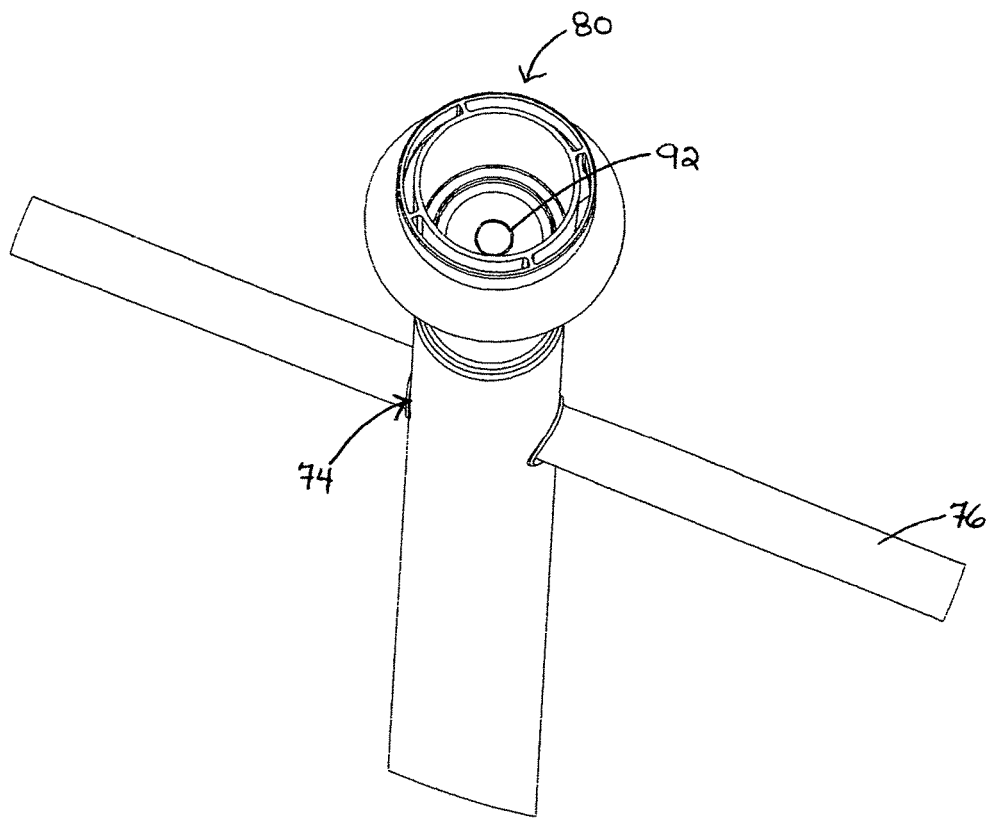
FIG. 16 is a perspective view of the upper end of a pole lower section and use of the finial.

Finial 80 has an outer tapering wall 82 and an inner cylindrical wall 84. Transverse ribs 86 extend between outer wall 82 and inner wall 84. There is also provided a finial. upper portion 88. Finial upper portion 88 has a diameter slightly less than inner wall 84 and there is thus provided a ledge or wall 90. Wall 90 is sized such that when finial 80 is turned upside down as shown in FIGS. 15 and 16, it will fit within the lower section 18 of pole 12. Interiorly of finial 80 is a bull's eye level 92 which may be used as shown in FIG. 16 when inserting lower section 18 into the soil. This ensures that the lower section 18 will be vertical after installation.

Figure 17:
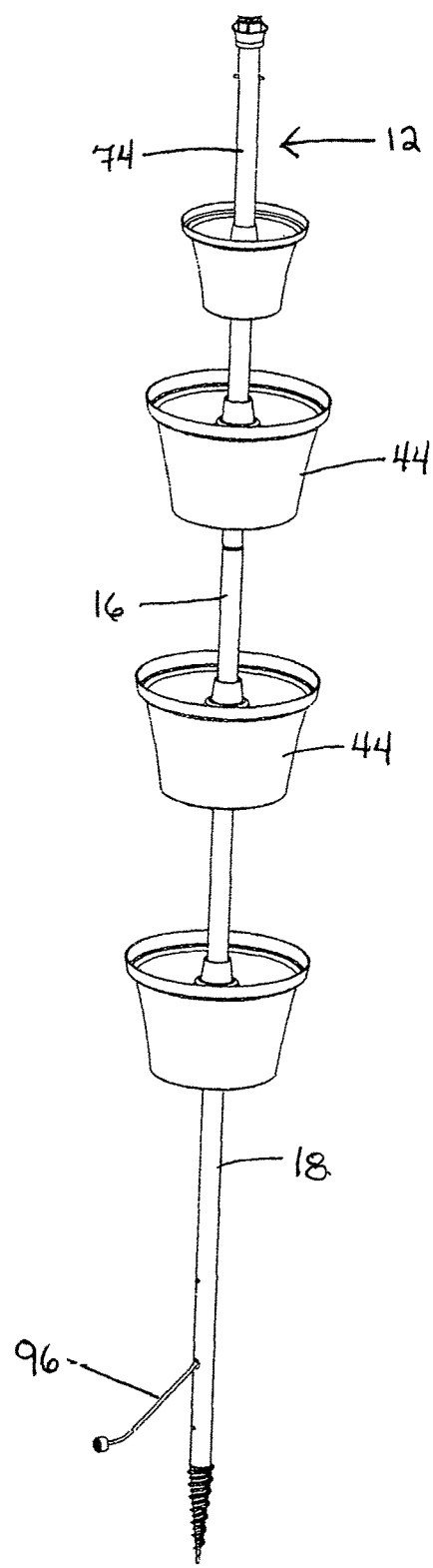
FIG. 17 is a perspective view of a further embodiment of the present invention.
Figure 18:
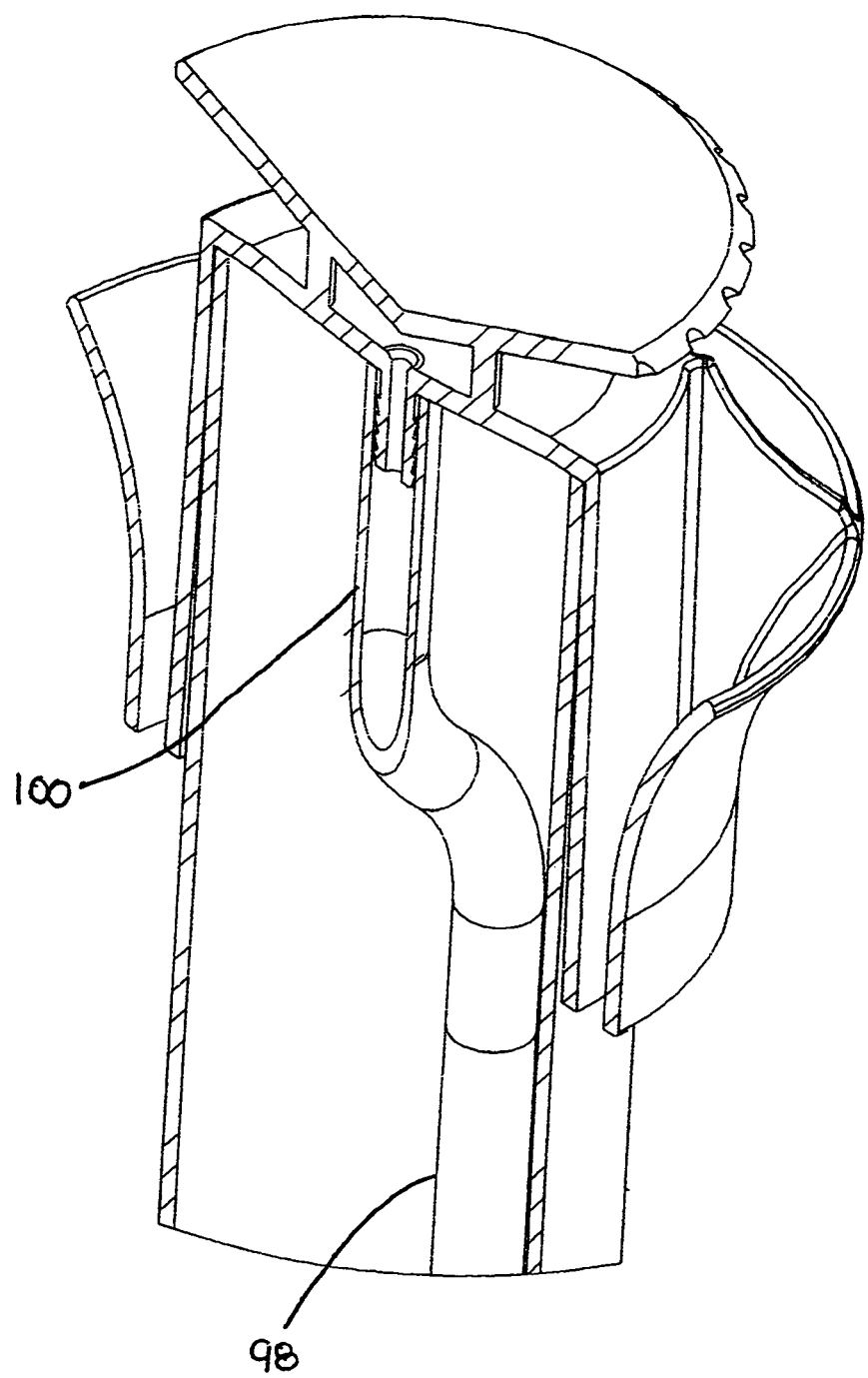
FIG. 18 is a cross-sectional view of a portion of the pole shown in FIG. 17.
Figure 19:
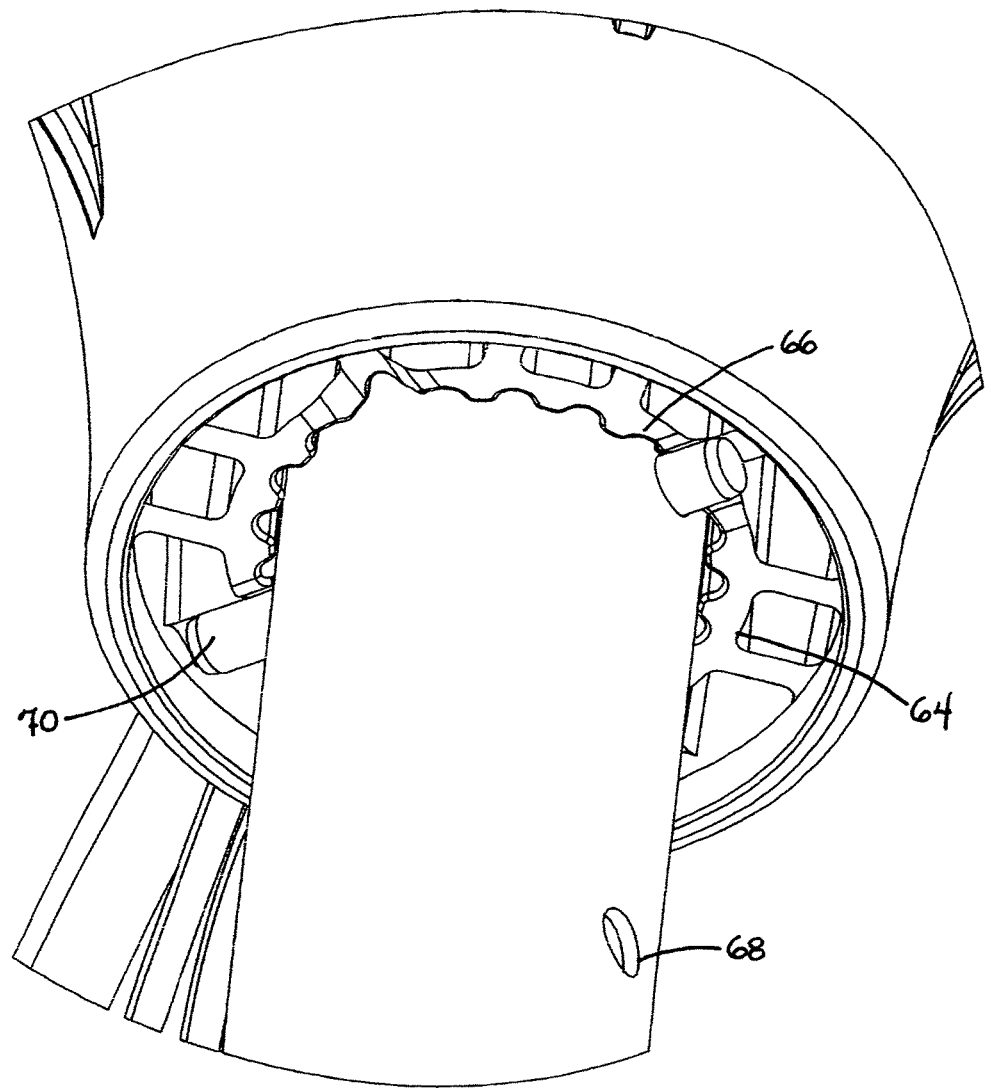
FIG. 19 is a perspective view of the lower portion of a hub secured to a pole.

In a further embodiment, pole 12 as shown in FIG. 17 may include a plurality of containers 44 mounted thereon. An inlet hose 96 for water or other liquid is connected to an interior vertical tube 98 which in turn is in fluid communication with a central segment 100 for supplying the liquid adjacent the containers.

Figure 20:
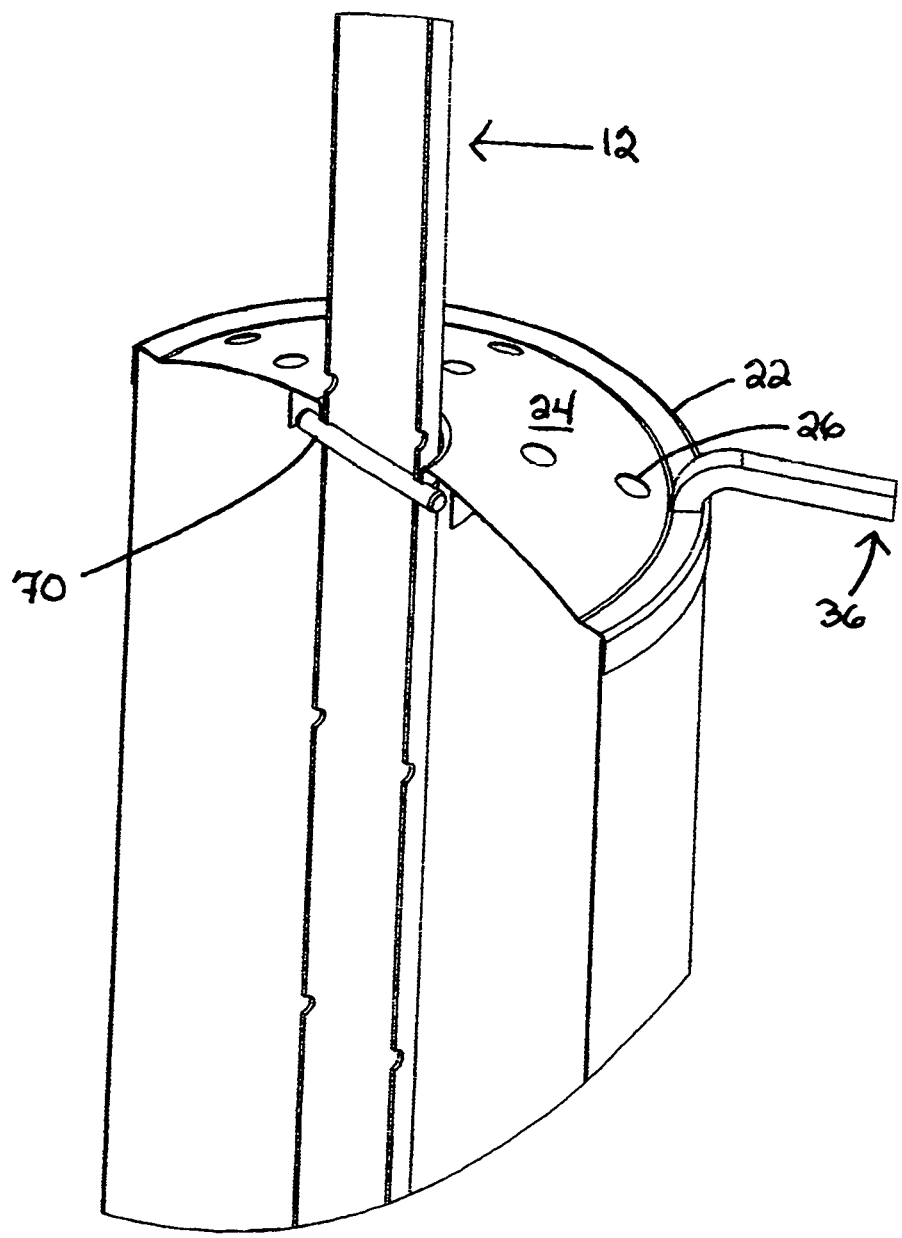
FIG. 20 is a perspective view of the upper portion of the baffle extending about a pole.
Figure 21:
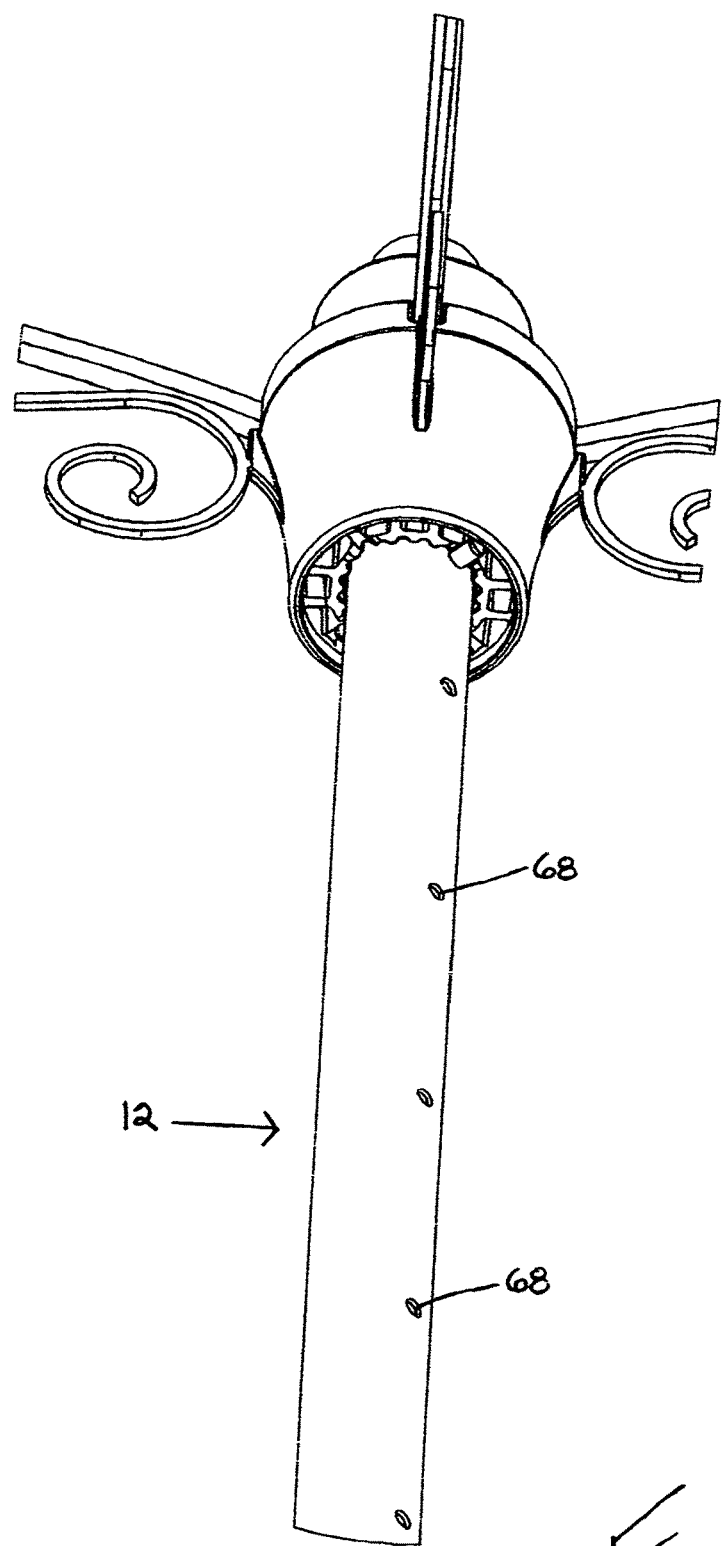
FIG. 21 is a perspective view illustrating the bottom of a hub.

As shown in FIG. 20, lower arm assemblies 36 may be secured to baffle 22. In an alternative, lower arm assembly 36 may be secured to pole 12.

Figure 22:
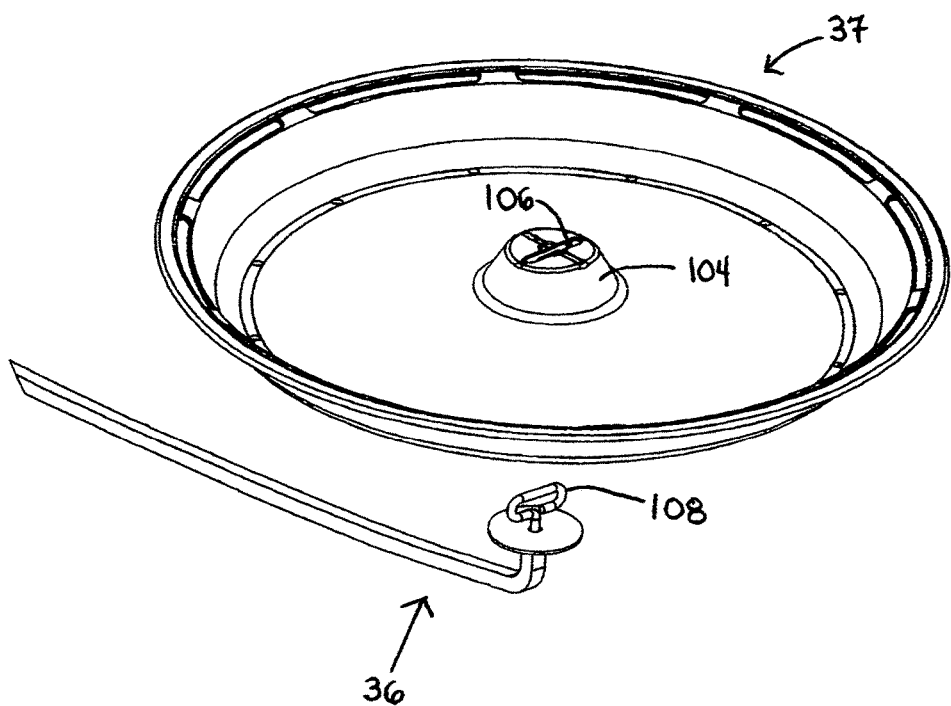
FIG. 22 is an exploded view illustrating the tray and method of attachment to an arm.

As shown in FIG. 22, trays 37 may be secured to lower arm assembly 36 by means of a center structure 104 having slots 106 which is designed to receive retaining member 108.

Figure 23:
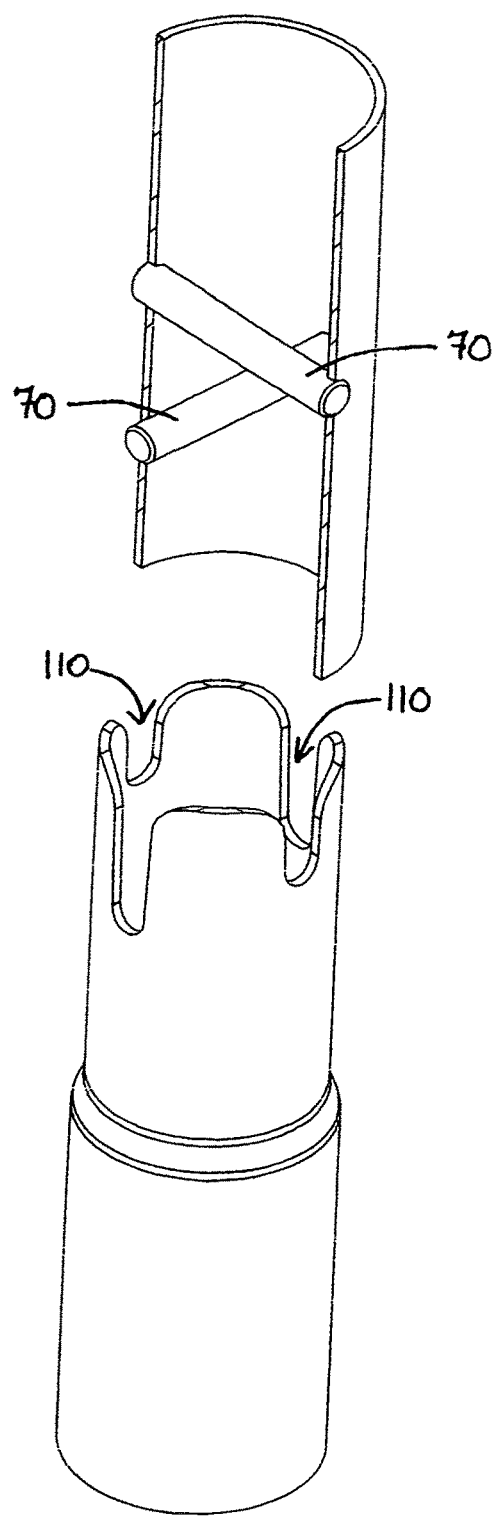
FIG. 23 is an exploded view illustrating one method of joinder of two pole sections.

One method of securing the pole sections together is illustrated in FIG. 23. In this, a pair of pins 70 are received in slots 110 such that an upper section of the pole is retained and supported by a lower section.

It will be understood that the above described embodiments are for purposes of illustration only and that changes and modifications may be made thereto without departing from the spirit and scope of the invention.

I claim:

1. A pole assembly comprising:
a pole;
a hub placed on said pole, said hub having a plurality of enclosed channels formed therein;
a plurality of arm assemblies, each arm assembly having a vertical segment designed to fit within a respective channel, an arm extending outwardly from said vertical segment; and
a finial sitting on an upper end of said pole, said finial having a level incorporated therein, said finial being designed to fit on said pole both in a normal orientation and also in an upside down orientation.

2. The pole assembly of claim 1 wherein said level comprises a bull's eye level formed on an interior wall of said finial.

3. The pole system of claim 1 wherein said pole is comprised of a plurality of sections, said sections being secured together to form said pole.

4. The pole system of claim 1 wherein said pole assembly includes a lower section, said lower section being screwthreaded for insertion into soil.

5. The pole assembly of claim 1 including a plurality of hubs secured to said pole.

6. The pole system of claim 1 further including a plurality of containers mounted on said pole.

7. The pole system of claim 6 wherein said pole includes an internal conduit, an inlet being located at a lower portion of said pole.

8. The pole assembly of claim 1 wherein said pole is comprised of a plurality of sections, a lower section being screwthreaded, said lower section further having a hollow interior designed to receive a bar.

\* \* \* \* \*